United States Patent Office 3,319,831
Patented May 16, 1967

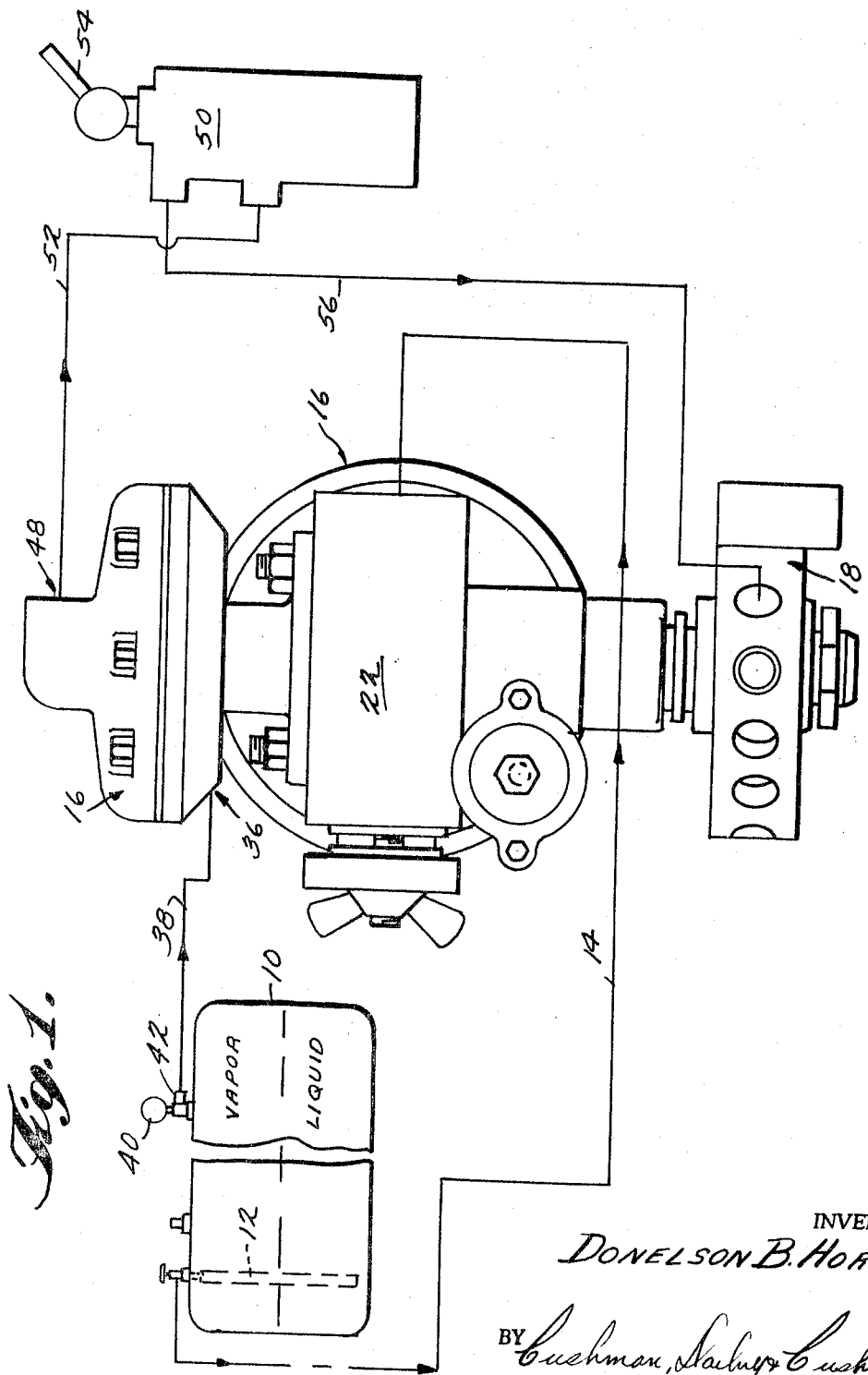

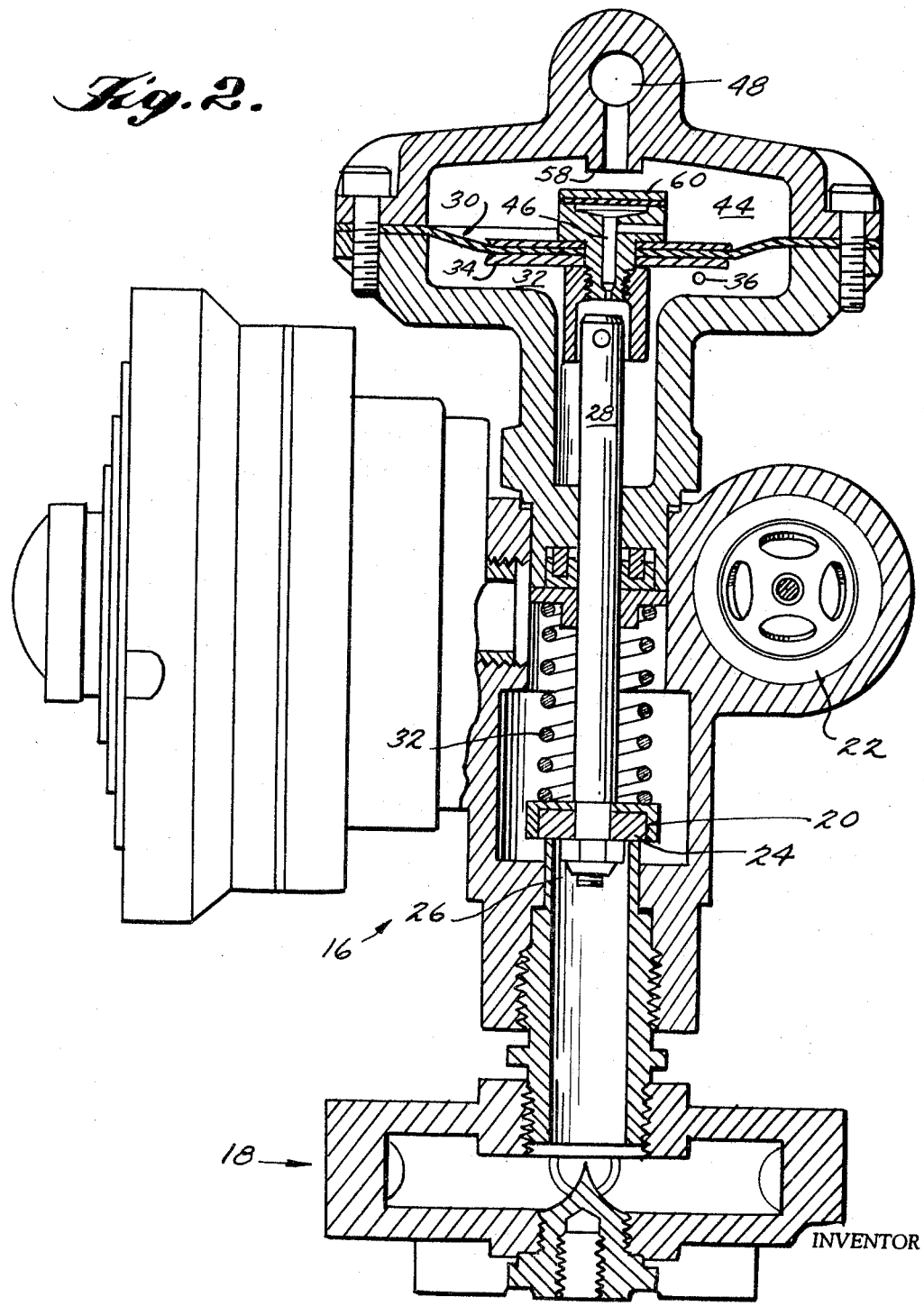

3,319,831
REMOTELY OPERATED DIAPHRAGM VALVE
AND SYSTEM
Donelson B. Horton, Madison, Ala., assignor to John Blue Company, Incorporated, Huntsville, Ala., a corporation of Alabama
Filed Aug. 20, 1965, Ser. No. 481,286
1 Claim. (Cl. 222—52)

This invention relates to the construction of a diaphragm-actuated valve, and in particular to a valve which is actuated remotely from the valve unit and which includes a time-lapse feature for delaying the diaphragm actuation of the valve.

The valve and the actuating means for a valve of this invention have particular application to controlling the flow of anhydrous ammonia being dispensed from a tank for use as fertilizer. Anhydrous ammonia is well known for its value as a plant food, and various devices have been utilized for dispensing such fertilizer in liquid form from a vehicle which traverses the ground to be fertilized. Such devices normally include a storage tank for holding anhydrous ammonia under sufficient pressure to maintain a liquid as well as a vapor phase of the product. The tank is mounted on a trailer or other vehicle and is adapted to be pulled over a field being treated by the anhydrous ammonia. It is necessary to include in such a dispensing device pressure control elements and metering devices in order to assure the dispensing of the anhydrous ammonia at a constant rate and density.

The conventional dispensing system provides for a tractor to pull the anhydrous ammonia dispensing tank, and controls are mounted on the tractor so that the driver can open and close valves which regulate the dispensing of the liquid fertilizer into the ground. When the tractor reaches the end of a row which is being treated, it is necessary to turn the tractor around and to shut off the flow of anhydrous ammonia to prevent a harmful quantity of fertilizer from being dispensed in the area where the vehicle is turned around. The prior art devices have had the disadvantage of requiring the driver to shut off the ammonia flow at the same time that he is in the process of turning the vehicle and its trailer at the end of a row. This diverts attention from the proper handling and steering of the tractor, and often the valve is not turned off at the right time because the driver is engaged in the turning activity. Alternatively, the driver shuts off the flow of fertilizer before reaching the end of a row, and this starves the plants at the end of a row from receiving any treatment.

It is the primary object of the present invention to provide an improved dispensing system which automatically provides a time delay between activation of a valve control element by the operator and actual closing of the dispensing valve. This arrangement enables the operator to actuate the control element before reaching the end of a row and then devote his entire attention to turning the tractor. The time-delay feature will close the dispensing valve at the end of the row thus preventing either starving or excess fertilization at this location. In practice it will be convenient to mount the control element on the tractor within easy reach of the operator. Preferably the time-delay feature will be operative only to delay closing of the dispensing valve so that rapid opening of the valve can be effected once the tractor has been turned around.

It is a more specific object to provide a dispensing system of the above type in which the control element is a valve, such as a quick shut-off valve, the closing of which causes a pressure differential to slowly build up across a diaphragm actuator for the dispensing valve thus effecting the desired time lapse. This time lapse is achieved by connecting one side of the diaphragm to high pressure ammonia vapor in the storage tank so that the pressure from the tank will tend to maintain the dispensing valve in an open position. The second side of the diaphragm is connected to a bleed line extending to the quick shut-off valve, and this maintains a reduced pressure on the second side of the diaphragm. A bleed orifice through the diaphragm permits ammonia vapor to flow from the inlet side of the diaphragm, through the diaphragm and to the quick shut-off valve. When the quick shut-off valve is closed, the pressure in the bleed line rises slowly until there is a lower pressure differential across the diaphragm, and at this point the diaphragm moves under the action of a spring to close the dispensing valve. Thus, there is a delay for the length of time that it takes the vapor pressure in the bleed line to rise sufficiently to balance the diaphragm.

This invention includes a particular valve unit construction incorporating the diaphragm actuating means and the associated dispensing valve controlled thereby. The valve unit is designed to be used in conjunction with a metering device for dispensing anhydrous ammonit through a plurality of outlets. The metering device may be carried by the valve unit so that liquid ammonia will flow directly through the metering device when the dispensing valve of the unit is open. Further, the valve unit construction provides for maintaining only a pressure differential which is sufficient to actuate the valve. Since the diaphragm is actuated by vapor pressure from a high pressure ammonia storage tank, it is contemplated that very high pressures may be attained, and such high pressures would damage or stress the diaphragm beyond the necessary amount to actuate the diaphragm. Accordingly, the valve and diaphragm construction includes means for maintaining a limited range of pressure differentials across the diaphragm. This prevents an excessive pressure build-up on one surface of the diaphragm and avoids undue stress on the diaphragm.

Although this invention has particular application to the dispensing of liquid anhydrous ammonia, it is equally well adapted to any fluid dispensing system requiring a time delay between the point of control and the point of actual valve movement. Other features and advantages of this invention will become apparent in the more detailed discussion which follows. In the detailed discussion, reference will be made to the accompanying drawings in which:

FIGURE 1 is a schematic diagram indicating the flow of fluids through the dispensing valve of this invention as related to the storage tank and the quick shut-off valve located on a tractor, and FIGURE 2 is a cross-sectoinal elevation of the dispensing valve and the diaphragm actuating means associated with the valve showing the dispensing valve in a closed position.

With reference to FIGURE 1, a storage tank 10 contains anhydrous ammonia under sufficient pressure to maintain a portion of the ammonia in a liquid phase for ultimate dispensing into the ground. The liquid phase is shown in the lower part of the storage tank 10, and the space above the liquid phase is filled with anhydrous ammonia vapor under high pressure. A suitable dispensing tube 12 is included in the tank, and this tube is of a sufficient length to receive liquid anhydrous ammonia from the lower part of the tank. The dispensing tube 12 is connected to a liquid line 14 leading to the valve control unit 16, which is a part of this invention. In a dispensing operation, liquid anhydrous ammonia flows through the line 14 to the valve control unit 16, and from there to a manifold 18 which is connected to a plurality of dispensing conduits leading down to the ground which is to be treated.

Referring to FIGURE 2, it can be seen that the valve control unit 16 includes a dispensing valve 20 which may be opened and closed to control flow of liquid anhydrous ammonia through the valve unit. The valve unit 16 has an outer casing which includes the dispensing valve 20, and provision is made for liquid from the line 14 to flow into the casing and past the valve 20 when that valve is opened. Liquid ammonia is received in the valve unit 16 through the filter cartridge 22, and from there the liquid flows downwardly past the dispensing valve 20 when it is open and into the manifold 18. The dispensing valve 20 is of any conventional construction and includes a sealing surface 24 which may be made of rubber or other material and which engages the tubular end of port 26 when the valve is reciprocated toward the port to a closed position. The dispensing valve 20 carries a stem portion 28 which is connected at its upper terminal end to a flexible diaphragm means 30, and the diaphragm 30 actuates the main valve 20 to closed and open positions. The diaphragm regulating means is included in a separate portion of the casing for the valve unit 16, and the diaphragm means is sealed from the flow of liquid in the lower part of the casing. The diaphragm 30 is carried for flexing movements in an upper part of the casing, and there are separate fluid chambers above and below the diaphragm. Fluid pressure within the respective chambers determines the position of the diaphragm and the position of the valve 20 connected to the diaphragm. The valve unit 16 includes a spring 32 which normally urges the dispensing valve 20 to a closed sealed position against the open end of port 26. However, the force of the spring may be overcome by a sufficient pressure of fluid against the bottom surface 34 of the diaphragm 30. An inlet 36 is provided in the chamber 37 which communicates with the bottom surface 34 of the diaphragm 30, and this inlet is connected to a vapor line conduit 38 leading into the vapor phase of the storage tank 10. Thus, high pressure ammonia vapor is received through the line 38 and into the inlet 36 for the purpose of controlling actuation of diaphragm 30 and its connected dispensing valve 20. The vapor line 38 is preferably connected to the tank 10 through the usual pressure gauge unit 40. Of course, the vapor line could be connected to any opening which communicates with the vapor space in the tank, but the pressure gauge is selected because it includes a small orifice in communication with the tank which limits the flow of high pressure vapor from the tank and to the gauge. This small orifice provides maximum safety, and sufficient vapor will flow through the orifice and through the T pipe 42 which is connected to the pressure gauge unit to actuate the dispensing valve 20.

The valve unit 16 also includes a chamber 44 above the diaphragm 30, and it will be appreciated that the differences in pressures established in the chambers 37 and 44 will determine the position of the flexible diaphragm and also the position of the valve 20. A by-pass conduit 46 is provided through the diaphragm in order to allow flow of high pressure fluid from the lower chamber 37 to the upper chamber 44. An outlet 48 communicates with the upper chamber 44 and allows a flow of vapor from that chamber through a vapor line 52 and to a quick shut-off valve 50. The quick shut-off valve 50 is mounted on the tractor and may be of any conventional construction. The valve 50 includes a manually operated control lever 54 which acts to close and open the fluid lines leading to and from the quick shut-off valve. When the manual control lever is moved to an open position, a valve within the quick shut-off means is actuated to open the vapor line 52 leading to the quick shut-off means. Also a vapor bleed line 56 is opened and this permits a continuous flow of vapor through the quick shut-off means when the control means is in an open position. Conversely, a movement of the control lever 54 to a closed position stops flow of vapor through the valve 50.

When it is desired to dispense liquid anhydrous ammonia from the storage tank 10 and through the manifold 18, the manually operated quick shut-off means 50 is moved to an open position. This open position permits a flow of high pressure vapor from the top of the tank 10 and into the lower chamber 37 beneath the diaphragm 30 within the valve unit 16. As pressure builds up beneath the diaphragm and against the bottom surface 34 of the diaphragm, the downward force of the spring 32 is overcome and the valve 20 is moved to an open position. When the dispensing valve 20 is opened, liquid anhydrous ammonia flows from the liquid phase part of the tank 10 through the liquid line 14 and past the valve 20 into the manifold 18. While liquid ammonia is flowing through the valve 20, vapor ammonia is continuously received in the lower chamber 37 from the vapor line 38, and this vapor passes from the lower chamber 37 to the upper chamber 44 through the by-pass conduit 46. However, there is no pressure build-up on the upper surface of the diaphragm because vapor is continuously bled off from the upper chamber through the vapor line 52. The vapor in the line 52 passes completely through the quick shut-off valve unit 50 and out through the bleed line 56. The bleed line 56 preferably leads to the same manifold 18 which is dispensing liquid ammonia, and in this manner the excess vapor is mixed with the ammonia being dispensed.

When it is desired to stop the flow of liquid ammonia, the driver of the tractor turns the control lever 54 of the quick shut-off valve 50 to a closed position. This position closes the quick shut-off valve unit and stops all fluid flow through that unit. As a result, there is a gradual build-up of pressure in the vapor line 52, and this pressure build-up eventually results in the gas pressures being substantially equalized between the upper surface of the diaphragm and the lower surface of the diaphragm. When the pressure in chamber 44 equalizes with the pressure in chamber 37, the valve 20 is moved to its closed position with the assistance of the spring 32. It is an important feature of this invention that there is a delay between the time that the quick shut-off valve 50 is actuated and the time when the dispensing valve 20 is moved to a closed position. This delay is a result of the time it takes for vapor pressure to substantially equalize between chamber 44 and chamber 37 as the flow between these chambers is restricted by an orifice in the bypass conduit 46. With such a delay feature, the driver of a tractor may actuate the quick shut-off valve from his riding position on the tractor just before he reaches the end of a field being treated with the liquid fertilizer. Liquid continues to flow as the driver reaches the end of the field and is executing the turning movements necessary to turn the tractor around for a new row in the opposite direction. While the driver is engaged in the turning activity, the delay feature of the diaphragm-actuated valve 20 closes the valve without any further actions by the driver. Upon completing the turning movements, and starting a new trip across the field, the driver merely turns the quick shut-off valve to its open position, and this starts an immediate flow of liquid through the manifold 18.

When the quick shut-off valve is turned to its open position, the vapor in the upper chamber 44 and line 52 is permitted to immediately flow through the quick shut-off valve 50 and this releases the pressure built up in the upper chamber 44. High pressure vapor from the line 38 resumes its flow into the lower chamber 37 and overcomes the action of spring 32 against the valve 20. Thus, the metered flow of liquid is started quickly by the action of opening the quick shut-off valve means 50.

The valve unit 16, as shown in FIGURE 2, also includes a construction to prevent an excessive build-up of pressure on the diaphragm 30. In dispensing anhydrous ammonia from a high pressure storage tank, a range of vapor pressures may be encountered from as low as 20 pounds per square inch to as high as 250 pounds of pressure per square inch. Of course, the area of the diaphragm 30 is large enough for the diaphragm to be actuated at the lowest tank pressure encountered, but it is conceivable that the same diaphragm will be subpected to the highest tank pressures encountered. For this reason, a secondary valving system is incorporated in the upper chamber 44 of the valve unit 16. The secondary valving system includes a valve seat 58 and a shut-off disc 60 which is carried by the flexible diaphragm 30. When the diaphragm 30 is raised by sufficient pressure in the lower chamber 44 to open the dispensing valve 20, it has already been noted that vapor in the upper chamber 44 is continually draining out of that chamber so as to maintain a sufficient pressure differential between the upper chamber 44 and the lower chamber 37 to hold the valve 20 open. If it takes only 20 pounds of tank pressure to intially open the valve 20, it can be seen that any additional tank pressure being received in the lower chamber 37 would tend to stress the diaphragm 30 into an extreme upward position. Under very high tank pressures, the stress on the diaphragm could rupture or damage the diaphragm element, and this could require costly shutdown time and repair of the valve unit 16. However, with a secondary valving system positioned at the outlet of the upper chamber 44, a balance of pressures is maintained on the two sides of the diaphragm, so as to prevent extreme stresses against the diaphragm. As pressure continues to build up in the lower chamber 44, the diaphragm 30 is moved upwardly beyond the position necessary to open the valve 20. Continued upward movement of the diaphragm positions the disc 60 against the valve seat 58, thus cutting off the normal flow of vapor out of the upper chamber and through the vapor line 52. As soon as the vapor line 52 has been closed by the secondary valve, pressure in the upper chamber 44 builds up from the passage of vapor from the lower chamber into the upper chamber through the by-pass conduit 46. The pressures approach a balancing point, and if the differential decreases, the shut-off disc 60 is pulled downwardly away from the valve seat 58 by the tension of the spring 32 acting on the valve 20. The opening of the secondary valve is not sufficient to shut off liquid flow through the valve 20 but is sufficient to re-establish the pressure differential required to maintain the valve 20 in an open position. This feature prevents an excessive build-up of pressure on the lower side of the diaphragm, and at the same time maintains the diaphragm within a range of positions which allows flow of liquid through the dispensing valve 20.

Although the valve and system described by this invention have particular application to the dispensing of anhydrous ammonia, such a valve is useful in any fluid-dispensing system where it is desirable to incorporate a delay in valve actuation and to maintain a limited range of pressure differentials across a diaphragm valve actuator. By mounting the valve unit 16 on the trailer which carries the storage tank 10, it is possible to directly connect the valve unit to the manifold 18. It is conceivable than a similar valve unit could be mounted on the tractor itself, and other remote control devices could be attached to such a valve unit. However, it is preferred that any control device use as few hoses as possible for reasons of cost and safety. In the present system, only one high pressure hose, the vapor line 52, leads to the area of the tractor driver, and the only other hose, bleed line 56, is at a lower pressure. Depending on the material being dispensed, it is contemplated that the bleed line 56 may be alternately exhausted to the atmosphere rather than drained into the dispensing device, as shown. Other variations and modifications will become apparent to those skilled in the art, and such changes are within the scope of this invention.

I claim:

A dispensing system for dispensing highly volatile liquid from a supply tank comprising:

liquid conduit means for conveying liquid from said tank to a liquid dispenser, a valve control unit having a dispensing valve for opening and closing said liquid conduit, and including a fluid-controlled diaphragm for actuating said dispensing valve, a first vapor conduit leading from a vapor section of said supply tank and into a first chamber adjoining a first surface of said diaphragm in said unit for supplying fluid to said first chamber to actuate said dispensing valve to an open position, a by-pass conduit connecting said first chamber with a second chamber within said unit, said second chamber adjoining a surface of said diaphragm which is opposed to said first surface of the diaphragm, a second vapor conduit leading from said second chamber for bleeding vapor from said second chamber, a secondary valve means carried by said diaphragm for opening and closing said second chamber relative to said second vapor conduit, and separate valve means included in said second vapor conduit for stopping and starting the flow of vapor from said second chamber, said separate valve means being actuated separately from said valve control unit so that a closing of said second vapor conduit by the separate valve means results in a delayed increase of pressure in said second chamber for delaying a closing of the dispensing valve, while providing a quick release of pressure in the second chamber when the separate valve is opened, and whereby said dispensing valve may be regulated by pressure differential changes on opposed surfaces of said diaphragm.

References Cited by the Examiner

UNITED STATES PATENTS

| | | | |
|---|---|---|---|
| 806,478 | 12/1905 | Marshall | 251—61 X |
| 1,724,977 | 8/1929 | Stein | 251—61 X |
| 1,767,201 | 6/1930 | Boynton | 251—61 X |
| 2,262,031 | 11/1941 | Meyer | 222—57 |
| 2,691,358 | 10/1954 | Peck | 222—504 X |
| 2,830,743 | 4/1958 | Rimsha et al. | 222—504 X |
| 3,092,070 | 6/1963 | Wright | 251—61 X |

FOREIGN PATENTS

| | | |
|---|---|---|
| 946,618 | 1/1964 | Great Britain. |

WALTER SOBIN, *Primary Examiner.*